United States Patent [19]

Ehrhart

[11] 4,260,717

[45] Apr. 7, 1981

[54] HIGH PERFORMANCE URETHANE COATING WHICH IS A SOLVENT SOLUTION OF A POLYESTER CONTAINING HYDROXYL GROUPS AND AN ALIPHATIC DIISOCYANATE

[76] Inventor: Wendell A. Ehrhart, 160 Schoolhouse La., Hellam, Pa. 17406

[21] Appl. No.: 111,100

[22] Filed: Jan. 10, 1980

[51] Int. Cl.$^3$ .............................................. C08G 18/24
[52] U.S. Cl. ...................................... 528/59; 528/80; 528/81
[58] Field of Search .............................. 528/59, 80, 81

[56] References Cited

U.S. PATENT DOCUMENTS

| | | | |
|---|---|---|---|
| 3,351,573 | 11/1967 | Skreckoski | 260/18 TN |
| 3,351,575 | 11/1967 | Gilchrist | 260/38 |
| 3,652,508 | 3/1972 | Segur et al. | 528/59 |
| 4,048,104 | 9/1977 | Svoboda et al. | 528/59 |
| 4,131,693 | 12/1978 | Wendt et al. | 528/80 |
| 4,138,299 | 2/1979 | Bolgiano | 204/159.16 |
| 4,145,515 | 3/1979 | Pogozelski et al. | 528/80 |

*Primary Examiner*—Maurice J. Welsh

[57] ABSTRACT

A liquid heat and moisture reactive coating composition, especially adapted for forming a no-wax coating on plastic flooring products. The coating is a solvent solution of a polyester having an acid number of less than about 3 and an average hydroxyl equivalent weight of between about 750 to 1400 and an aliphatic diisocyanate. The polyester is based on a mixture of dicarboxylic acids of which at least 75 weight percent is one or more of the isomeric benzene dicarboxylic acids and a mixture of polyols having a hydroxyl equivalent weight of less than about 130. Of the polyol mixture, at least 60 weight percent is 1,6-hexanediol or 1,5-pentanediol or mixtures thereof with no more than 15 weight percent being polyols having a functionality greater than 2. Based on 100 parts by weight reactants, 55 to 90 parts by weight of said polyester is reacted with 10 to 30 parts by weight of an aliphatic diisocyanate in the presence of 0.01 to 5 parts by weight organotin catalyst and the coating may also contain up to 15 parts by weight of polyol reactants having a hydroxyl equivalent weight of up to 600 in addition to the polyester.

6 Claims, No Drawings

HIGH PERFORMANCE URETHANE COATING WHICH IS A SOLVENT SOLUTION OF A POLYESTER CONTAINING HYDROXYL GROUPS AND AN ALIPHATIC DIISOCYANATE

BACKGROUND OF THE INVENTION

1. Field of the Invention

The field of the invention relates to a high performance coating particularly adapted for use as a clear, no-wax protective wear layer on plastic flooring.

2. Description of the Prior Art

No-wax coatings for vinyl composition flooring are well known in the vinyl flooring industry. These coatings are designed to form tough, glossy wear layers which are easily maintained and which do not require the waxing and buffing usually associated with vinyl sheet flooring maintenance. Solvent based coatings which require both moisture and heat cure as well as fully UV curable coatings, have been successfully developed and coatings which required both a UV and moisture cure as exemplified by U.S. Pat. No. 4,138,299 have also been developed. The coatings to which this invention relates are the solvent based heat and moisture curable systems. Prior art coatings are commonly solvent solutions of —NCO terminated prepolymers which are based on polyether and/or polyester polyisocyanate reaction products. U.S. Pat. No. 3,351,573 is an example of prior art directed to typical polyether and polyester-polyisocyanate reaction products which are utilizable as pre-polymers in coatings of this type.

SUMMARY OF THE INVENTION

A liquid heat and moisture reactive coating composition, especially adapted for forming a no-wax wear layer has been developed based on a unique polyester and an aliphatic diisocyanate. The coating is a solvent solution of a polyester having an acid number of less than about 3 and an average hydroxyl equivalent weight of between about 750 and 1400 and an aliphatic diisocyanate. The polyester is based on a mixture of dicarboxylic acids of which at least 75 weight percent is one or more of the isomeric benzene dicarboxylic acids and a mixture of polyols having a hydroxyl equivalent weight of less than about 130. Of the polyol mixture, at least 60 weight percent is 1,6-hexane diol or 1,5-pentanediol or mixtures thereof and no more than 15 weight percent is of polyols having a functionality greater than 2. Based on 100 parts by weight reactants, 55 to 90 parts by weight of said polyester is reacted with 10 to 30 parts by weight of an aliphatic diisocyanate in the presence of 0.01 to 5 parts by weight organotin catalyst. The coating may contain up to 15 parts polyols by weight having a hydroxyl equivalent weight of up to about 600 in addition to the polyester.

DETAILED DESCRIPTION

Conventional no-wax coatings which react to form durable wear layers are generally solvent based systems containing prepolymers based on the reaction product of polyisocyanates and polyethers and/or polyesters. Generally, because they yield films having better light stability, aliphatic diisocyanates are usually utilized in forming the prepolymer. These include xylyene diisocyanate, isophorone diisocyanate, 1,6-hexamethylene diisocyanate 1,4 bis (isocyanatomethyl) cyclohexane and 4,4-diisocyanato dicyclohexyl methane. The weight of polyisocyanate reactant in conventional coatings is commonly from 35 to 65 percent of the weight of the total polyisocyanate polyol reactants.

The polyesters employed in forming coatings of this invention are polyesters having an acid number of less than about 3 and an average hydroxyl equivalent weight of between 750 and 1400. They are prepared from a mixture of dicarboxylic acids containing at least about 75 weight percent of one or more the isomeric benzene dicarboxylic acids such as phthalic, isophthalic, and terephthalic. The remainder of the acids component are aliphatic or alicyclic dicarboxylic acids such as azelaic and adipic acids. The polyols are a mixture of low hydroxyl equivalent weight polyols, polyols having a hydroxyl equivalent weight of less than about 130, containing at least about 60 weight percent of 1,6-hexanediol or 1,5-pentanediol or mixtures thereof with no more than 15 weight percent of the polyol mixture being comprised of polyols having a functionality greater than 2.

Based on 100 parts by weight reactants, the coatings of this invention comprise solvent solutions of 55 to 90 parts by weight of the above polyesters, 10 to 30 parts by weight aliphatic diisocyanate and up to 15 parts by weight of polyols having a hydroxyl equivalent weight of up to 600.

PREPARATION OF POLYESTER POLYOLS

Table I lists the ingredients in the polyester polyols identified in Examples 1 through 8. In forming the polyester polyols, the ingredients indicated were charged to a 5-liter, 5-necked flask, fitted with mechanical stirrers, packed upright partial condensers with still heads and take off condensers on top, thermometers and gas inlet tubes under the surface. The mixtures were heated rapidly to 180° C. and then gradually to 215°±5° C. Nitrogen gas was bubbled slowly into the mixture at first, but then when about 75% of the theoretical water was obtained, the flow was gradually increased toward 600 milliliters per minute. When the acid numbers fell to 0.50±0.50, the materials were cooled to about 150° C., poured into cans and sealed. For Example 1, carbon dioxide was used in place of nitrogen. Analysis of these polyols are given in Table I.

TABLE I

Polyester Polyols

| Ingredients | 1 grams | 2 grams | 3 grams | 4 grams | 5 grams | 6 grams | 7 grams | 8 grams |
|---|---|---|---|---|---|---|---|---|
| Isophthalic Acid | 1992 | 1660 | 1209 | 1956 | 1043 | 1050 | 1660 | — |
| Phathalic Anhydride | — | — | 581 | — | — | 766 | — | — |
| Terephthalic Acid | — | — | — | — | 853 | — | — | 1510 |
| 1,6 Hexanediol | 1330 | 920 | 882 | 1258 | 1045 | 950 | 914 | 381 |
| 1,5 Pentanediol | — | — | — | — | — | — | — | 350 |
| 1,4 Butanediol | 297 | — | — | — | — | — | — | — |
| Neopentyl Glycol | — | — | — | 166 | — | — | — | — |

TABLE I-continued

| | Polyester Polyols Example | | | | | | | |
|---|---|---|---|---|---|---|---|---|
| Ingredients | 1 grams | 2 grams | 3 grams | 4 grams | 5 grams | 6 grams | 7 grams | 8 grams |
| Diethylene Glycol | — | — | 89 | — | — | 366 | 254 | — |
| Triethylene Glycol | — | 375 | 471 | — | 437 | — | — | 409 |
| Trimethylolpropane | — | 112 | 133 | 121 | 123 | 144 | 121 | 97.3 |
| Dibutyltin bis-octylthioglycolate Catalyst | 3.6 | — | — | — | — | — | — | — |
| Dibutyltin bis-laurylmercaptide Catalyst | — | 1.53 | 2.14 | 1.54 | 1.54 | 1.64 | 1.47 | 1.21 |
| Acid Number | 0.68 | 0.26 | 0.50 | 0.50 | 0.80 | 0.50 | 0.41 | 0.57 |
| Hydroxyl Number | 71.9 | 50.8 | 53.7 | 57.6 | 56.0 | 55.2 | 58.7 | 49.1 |
| Eq. Wt. | 773 | 1100 | 1053 | 966 | 989 | 1007 | 949 | 1129 |

PREPARATION OF —NCO TERMINATED PREPOLYMERS

In reacting the polyesters prepared in accordance with Examples 1 through 8 with the desired aliphatic diisocyanate to form the —NCO terminated prepolymer a moisture free mixture of solvent, polyol and catalyst is first prepared by charging the molten polyesters and solvents into a 5-liter, 5-necked flask equipped with stirrers, thermometers, gas inlet tubes, heating mantles, and Barrett water traps with water cooled upright condensers. The ingredients are listed in Table II entitled Moisture "Curable" Prepolymers under Examples 9 through 16. The indicated amount of solvent was then distilled under a blanket of nitrogen gas to carry out any water present. The mixture was then cooled under nitrogen to 40°±20° C. and the diisocyanate was charged rapidly with good stirring, followed by the initial indicated amount of catalyst. The mixtures were then heated under dry nitrogen gas with stirring to the indicated reaction temperatures and held at same for the indicated times. The mixtures were cooled to room temperature and the additional amounts of catalysts added if the coatings were to be utilized within a few days. The solutions prepared were stored in sealed cans and, when stored for more than a few days, the additional amounts of catalysts were stirred in a day or two before utilizing the coatings. Minor amounts of optional additives such as UV screeners, antioxidants, and flow aids may also be stirred in. When coated onto release paper to form a wet film of approximately 10 mils by a reverse roll coater and dried and reacted with atmospheric moisture in a continuous forced draft oven with four zones having respective temperatures of 190° F., 250° F., 300° F. and 300° F. tough, somewhat leathery films of good tear strength and elongation were obtained. The cured films were about 3.5 mils in thickness. There were subjective observations of the physical film properties except as given in Table II. When key coated and transferred to sheet vinyl flooring, all these formulations led to "no-wax" sheet flooring judged to be of comparable or better quality than present commercial products with the exception as to Examples 12 and 13 which were judged to be slightly inferior in gloss retention. Thus, simulated and real foot traffic showed resistance to soiling, scratching, and loss of gloss to be comparable to commercial controls and various stain resistance tests showed these formulations to be superior. The Frick Tabor abrasion test also gave results comparable to commercial controls on all formulations.

TABLE II

| | | Moisture Curable Prepolymers Example | | | | | | | |
|---|---|---|---|---|---|---|---|---|---|
| Ingredients | | 9 grams | 10 grams | 11 grams | 12 grams | 13 grams | 14 grams | 15 grams | 16 grams |
| 4,4' diisocyanato dicyclohexyl methane | | 356 | 359 | 331 | 383 | — | — | — | 354 |
| 1,4 bis-(isocyanatomethyl) Cyclohexane | | — | — | — | — | — | 330 | — | — |
| Xylylene diisocyanate | | — | — | — | — | — | — | 327 | — |
| Isophorone diisocyanate | | — | — | — | — | 255 | — | — | — |
| LHT-112 Polyethertriol | | — | — | — | 151 | — | — | — | — |
| (Reaction product of glycerin and propylene oxide with equivalent weight of about 500) | | | | | | | | | |
| Polyester from Ex. | #1 | 1148 | — | — | — | — | — | — | — |
| | 2 | — | 1077 | — | — | — | — | — | — |
| | 3 | — | — | 1046 | — | — | — | — | — |
| | 4 | — | — | — | 880 | — | — | — | — |
| | 5 | — | — | — | — | 1080 | — | — | — |
| | 6 | — | — | — | — | — | 1245 | — | — |
| | 7 | — | — | — | — | — | — | 1100 | — |
| | 8 | — | — | — | — | — | — | — | 1069 |
| Xylene | | 2194 | — | — | — | — | 2118 | 2166 | — |
| Toluene | | — | 2187 | 2269 | 2292 | 2030 | — | — | 2155 |
| Solvent Distilled | | 566 | 197 | 204 | 207 | 197 | 191 | 197 | 194 |
| Catalyst | | T-20(1) | UL-28(2) | UL-28 | T-12(3) | UL-28 | UL-28 | UL-28 | UL-28 |
| Initial Amt. (grams) | | — | 1.44 | 1.38 | 1.42 | 0.665 | None | 5.72 | 2.85 |
| Add. Amt. (grams) | | 0.453 | 5.73 | 5.50 | 12.7 | | | | |
| Reaction Temp. (C.°) | | 90° | 105° | 80° | 105° | 105° | 100° | 80° | 80° |
| Reaction Time | | 120 min | 40 min | 70 min | 40 min | 50 min | 15 min | 90 min | 120 min |
| Viscosity | | 320 cps | 163 cps | 118 cps | 110 cps | 167 cps | 253 cps | 174 cps | 353 cps |
| Free Film Properties | | | | | | | | | |
| Tensile Strength | | | 5,200 psi | 4,140 psi | | | | 3,030 psi | |

TABLE II-continued

| | Moisture Curable Prepolymers | | | | | | | |
|---|---|---|---|---|---|---|---|---|
| | Example | | | | | | | |
| | 9 | 10 | 11 | 12 | 13 | 14 | 15 | 16 |
| Ingredients | grams | grams | grams | grams | grams | grams | grams | grams |
| % Elongation | | 198% | 178% | | | | 182% | |

(1) Dibutyltin bis-laurylmercaptide
(2) Dimethyltin bis-neodecanoate
(3) Dibutyltin dilaurate Suitable solvent components which may be utilized in the practice of the invention should have a chemical composition such that they are substantially free from reactive hydrogen as determined by the Zerewitnoff method (Kohler et al., 40 Journal of the American Chemical Society, pages 2181-2188, 1927). These solvents include toluene, xylene, various petroleum hydrocarbon distillate fractions, isopropyl ether, ethyl acetate, beta-ethoxy ethyl acetate, methyl ethyl ketone, and various mixtures thereof. The amount of solvent used will vary somewhat depending on the viscosity-imparting characteristics of the prepolymer. It is, in principle, however possible to conduct the process and form coatings in the absence of solvents if appropriate temperatures are employed, along with appropriate mechanical equipment.

As catalysts organo compounds of tetravalent tin wherein each tin atom is bonded to at least 1 carbon atom and at least 1 atom of oxygen, sulphur or chlorine are generally preferred (numerous known compounds of this type are disclosed in "Organotin Compounds" by R. K. Ingham and S. D. Rosenberg, pages 459-539, Chemical Reviews, Volume 60, No. 5, October 1960).

The high equivalent weight predominately hexylene "phthalate" polyols contribute many unexpected advantages to coatings for no-wax floors. First of all, they can be formulated with almost any aliphatic diisocyanate to produce coatings with excellent tensile strength, elongation, abrasion resistance and flexibility. In addition, these polyols have low isocyanate demand and coating properties are not highly dependent on the weight percent of diisocyanate employed, the coatings preferably are formulated at the 10 to 30 weight percent isocyanate level. These low weight percent diisocyanate coatings have excellent wear appearance characteristics including good gloss retention, stain resistance, resistance to soiling and scratching when subjected to foot traffic and sliding chairs, for example. Polyurethane coatings presently employed in no-wax flooring manufacture typically are derived from relatively lower equivalent weight polyethers and/or aliphatic polyesters and have high polyisocyanate demand with approximately 40 to 60 weight percent polyisocyanate being employed. Coatings based on these prepolymers vary widely in physical and wear appearance properties as one changes the type or amount of polyisocyanate employed therewith. Because of the high price and limited availability of the light stable aliphatic type polyisocyanates, current high usage rate is undesirable. There is also a lack of formulating latitude.

It is widely believed that the excellent wear appearance characteristics and physical properties of conventional polyurethane coatings is a result of crosslinks and of hydrogen bonds formed between urethane and/or urea groups. Since the coatings of the present invention have only about half or less of the crosslinks and hydrogen bondable groups of conventional coatings, it is surprising that their properties often match and/or exceed those of the conventional coatings.

In forming the coatings the ratio of NCO to OH groups is preferably between 1.3 to 1 and 3.6 to 1. When the polyester polyol is to be reacted rather completely prior to application to the substrate by forming a prepolymer, it is generally necessary to employ isocyanate to polyol ratios of greater than about to 2 to 1 to prevent gellation of the prepolymer although with difunctional polyols you could go as low as 1.3 to 1.

In the following examples the polyester, catalyst, solvent and diisocyanate are admixed immediately prior to coating the substrate.

The following polyesters were prepared following the same procedure as used in preparing the polyesters of Examples 1 through 8.

| Ingredients/Example | 17 grams | 18 grams |
|---|---|---|
| Isophthalic Acid | 1417 | 1425 |
| Phthalic Anhydride | 541.5 | 545 |
| 1,6 Hexanediol | 899 | 832 |
| Diethylene glycol | 498 | 481 |
| Trimethylol propane | 144.5 | 148 |
| Dibutyltin bis-laurylmercaptide | 2.19 | 4.69 |
| Acid Number | 0.50 | 0.50 |
| Hydroxyl Number | 49.7 | 62 |
| Eq. Wt. | 1118 | 898 |

The following coatings were made up.

| Ingredients/Example | 19 grams | 20 grams |
|---|---|---|
| Polyester polyol Ex. 17 | 76 | |
| Polyester polyol of Ex. 18 | | 80 |
| 4,4' diisocyanate dicyclohexyl methane | 24 | 20 |
| Xylene | 32 | 36 |
| Dibutyltin bis-octyl thioglycolate | 1 | 1 |

In preparing the coatings, the polyester and catalyst were first dissolved in the solvent. Immediately prior to use, the diisocyanate was mixed in. These coatings were then used as a 2 mil clear wear coat on a plastic sheet flooring formed from an 8 mil gelled and printed foamable layer having 6 mils of a clear plastisol layer. The coated gelled layers were expanded and cured in a four zone oven at temperatures of, respectively, 275° F., 275° F., 420° F., and 335° F. to form a plastic decorative sheet having a 25 mil printed foam backing with 6 mils of clear coat and 2 mils of tough, clear, glossy wear layer.

What is claimed is:

1. A liquid heat and moisture curable coating comprising a solvent solution of, based on 100 parts by weight reactants,
    (a) 55 to 90 parts by weight of a polyester having an acid number of less than 3 and an average hydroxyl equivalent weight of about 750 to 1400, said polyester being formed from a mixture of dicarboxylic acids of which at least 75 weight percent is one or more of the isomeric benzene dicarboxylic acids and a mixture of polyols having a hydroxyl equivalent weight of less than about 130, at least 60 weight percent of said polyol mixture being 1,6-hexanediol or 1,5-pentanediol or mixtures thereof and 0 to 15 parts by weight of a polyol having a functionality greater than 2;

(b) 10 to 30 parts by weight of an aliphatic diisocyanate;

(c) 0 to 15 parts by weight of polyols having a hydroxyl equivalent weight of less than about 600; and (d) an effective amount of an organotin catalyst Wherein the ratio of NCO to OH groups is between 1.3 to 1 and 3.6 to 1 and wherein said solvent is substantially free from reactive hydrogen.

2. The coating as defined in claim 1 wherein the polyester has been pre-reacted with the diisocyanate to form a solvent solution of urethane prepolymer prior to application of the coating to the substrate.

3. The coating as defined in claim 1 wherein the solvent, polyester and diisocyanate are mixed immediately prior to coating a substrate.

4. A coating in accordance with claims 1 to 3 wherein the aliphatic diisocyanate is selected from xylylene diisocyanate; isophorone diisocyanate; 1,6 hexamethylene diisocyanate; 1,4 bis (isocyanatomethyl) cyclohexane and 4,4' diisocyanato dicyclohexyl methane.

5. A plastic floor covering having a clear wear layer formed of the cured coating of claims 1 to 3.

6. A liquid heat and moisture curable coating consisting essentially of a solvent solution of a reactive —NCO terminated prepolymer wherein said prepolymer is the reaction product of, based on 100 parts by weight reactants, (a) 55 to 90 parts by weight of a polyester having an acid number of less than 3 and an average hydroxyl equivalent weight of about 750 to 1400, said polyester being formed from a mixture of dicarboxylic acids of which at least 75 weight percent is one or more of the isomeric benzene dicarboxylic acids and a mixture of polyols having a hydroxyl equivalent weight of less than about 130, at least 60 weight percent of said polyol mixture being 1,6-hexanediol or 1,5-pentanediol or mixtures thereof and 0 to 15 weight percent being of a polyol having a functionality greater than 2;

(b) 10 to 30 parts by weight of an aliphatic diisocyanate, (c) 0 to 15 parts by weight of polyols having a hydroxyl equivalent weight of less than about 600; and (d) an effective amount of an organotin catalyst Wherein the ratio of NCO to OH groups is between 1.3 to 1 and 3.6 to 1 and wherein said solvent is substantially free from reactive hydrogen.

* * * * *